United States Patent
Suvakovic et al.

(10) Patent No.: US 9,369,207 B2
(45) Date of Patent: Jun. 14, 2016

(54) APPARATUS AND METHOD FOR TWO-STAGE OPTICAL NETWORK

(75) Inventors: Dusan Suvakovic, Pleasanton, CA (US); Hungkei K. Chow, Livingston, NJ (US); Man-Fai Lau, Baltimore, MD (US); Peter J. Vetter, Summit, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 415 days.

(21) Appl. No.: 13/296,784

(22) Filed: Nov. 15, 2011

(65) Prior Publication Data

US 2012/0121265 A1    May 17, 2012

Related U.S. Application Data

(60) Provisional application No. 61/413,832, filed on Nov. 15, 2010.

(51) Int. Cl.
*H04B 10/291* (2013.01)
*H04B 10/272* (2013.01)
*H04Q 11/00* (2006.01)

(52) U.S. Cl.
CPC ............ *H04B 10/291* (2013.01); *H04B 10/272* (2013.01); *H04Q 11/0067* (2013.01); *H04Q 2011/0079* (2013.01)

(58) Field of Classification Search
CPC .................. H04B 10/29; H04J 14/08–14/086; H04Q 11/04–11/08; H04Q 2011/0033
USPC .................. 398/67, 72, 97, 153, 173–181
See application file for complete search history.

(56) References Cited

U.S. PATENT DOCUMENTS

| | | | |
|---|---|---|---|
| 5,717,510 A * | 2/1998 | Ishikawa et al. | 398/199 |
| 6,437,895 B1 * | 8/2002 | Farhan et al. | 398/182 |
| 2001/0021048 A1 * | 9/2001 | Desurvire | 359/124 |
| 2009/0204657 A1 * | 8/2009 | Goettfert et al. | 708/255 |
| 2010/0040363 A1 * | 2/2010 | Zhou | H04B 10/07953 398/10 |
| 2010/0061729 A1 * | 3/2010 | Weeber | 398/71 |
| 2010/0104287 A1 * | 4/2010 | Biegert et al. | 398/67 |
| 2011/0170560 A1 * | 7/2011 | Kyles | H03M 9/00 370/465 |
| 2011/0182198 A1 * | 7/2011 | Rittenhouse et al. | 370/252 |
| 2012/0321317 A1 * | 12/2012 | Zhang et al. | 398/72 |

OTHER PUBLICATIONS https://en.wikipedia.org/wiki/Decimation_(signal_processing).*
http://www2.alcatel-lucent.com/techzine/bipon-a-more-energy-efficient-tdm-pon/.*

* cited by examiner

*Primary Examiner* — David Payne
*Assistant Examiner* — Casey Kretzer
(74) *Attorney, Agent, or Firm* — RGIP LLC

(57) ABSTRACT

A manner of providing an energy-efficient two-stage PON using a multistage-PON repeater to forward data traffic and other communications between the first stage and the second stage. The multistage-PON repeater receives BI-PON transmission frames from and OLT and decimates them, forwarding data intended for end devices of the second stage. The multistage-PON repeater rate adapts the transmissions so that faster speeds may be associated with PON first stage communications and slower speeds are associated with PON second stage communications. Many though not all of the multistage-PON components are configured to operate at the slower clock speed, conserving energy. Upstream transmissions from the end devices of the second stage are buffered in the multistage-PON repeater and forwarded to the OLT according to an allocation schedule received from the OLT in a BI-PON frame.

1 Claim, 11 Drawing Sheets

PRIOR ART

PRIOR ART

APPARATUS AND METHOD FOR TWO-STAGE OPTICAL NETWORK

CROSS-REFERENCE TO RELATED APPLICATIONS

The present disclosure is related to and claims priority from U.S. Provisional Patent Application Ser. No. 61/413,832, entitled An Energy-Efficient Two-Stage Fiber-to-the-Terminal Access Network and filed on 15 Nov. 2010, the entire contents of which are incorporated by reference herein.

TECHNICAL FIELD

The present invention relates generally to the field of communication networks, and, more particularly, to an apparatus and method for providing a two-stage optical network.

BACKGROUND

The following abbreviations are herewith defined, at least some of which are referred to within the following description of the state-of-the-art and the present invention.
ADC Analog-to-Digital Converter
APON ATM PON
BER Bit Error Rate
BI-PON Bit Interleaved PON
BPON Broadband PON
CDR Clock/Data Recovery
CO Central Office
DAC Digital-to-Analog Converter
DBA Dynamic Bandwidth Allocation
EPON Ethernet PON
FEC Forward Error Correction
GE Gigabit Ethernet
GEM GPON encapsulation method
GPON Gigabit PON
IEEE Institute of Electrical and Electronics Engineers
ITU International Telecommunication Union
LNA Low Noise Amplifier
MAC Media Access Control
NRZ Non Return to Zero
OAM Operations, Administration, Management
ODN Optical Distribution Network
OLT Optical Line Terminal
ONT Optical Network Terminal
ONU Optical Network Unit
PC Personal Computer
PCS Physical Coding Sublayer
PMA Physical Medium Attachment
PMD Physical Medium-Dependent
PON Passive Optical Network
PP Packet Processing
RF Radio Frequency
TDM Time Division Multiplexing
TDMA Time Division Multiple Access
TV Television
VoIP Voice over Internet Protocol
Note that the techniques or schemes described herein as existing or possible are presented as background for the present invention, but no admission is made thereby that these techniques and schemes were heretofore commercialized or known to others besides the inventors.

Residential and enterprise network services including television, telephone, Internet access and a number of other emerging services are delivered to subscribers by means of a communications network. These large networks may be conceptually divided into a core network and an access network or networks. The core networks carry large amounts of digitally-encoded information over high-capacity cables or other transmission media. Access networks reach individual residences or multi-tenant dwelling units and other customers such as institutions or businesses to communicate with the core network through which the services are available.

The access network for residential or business subscribers, for example, is usually referred to as a wireline network, which may consist of optical fiber, copper wires, or coaxial cables. Electronic equipment in the network operator's CO (central office) on one end, and at the customer premises equipment at the other, define the access network and communicate using standard or occasionally proprietary protocols. An exemplary access network is illustrated in FIG. 1.

FIG. 1 is a simplified schematic diagram illustrating selected components of a typical PON 100 according to the existing art. In the CO, the OLT 105 provides a connection to the core network (not shown). OLT 105 also performs several management functions such as routing data traffic toward the proper destination and in the proper format and scheduling PON transmissions in both the downstream and upstream directions.

In this example, an optical splitter 110 receives downstream traffic transmitted by OLT 105, typically over a single optical fiber, and splits the signal for continued transmission along multiple fibers, one corresponding to each ONT served. In FIG. 1, ONTs 115a through 115n are shown, each corresponding to a subscriber network. As implied by the ellipsis, there could be any number of ONTs served by OLT 105 via optical splitter 110, though in a typical implementation there may be 32 or as many as 64. Likewise, there may be numerous optical splitters, each dividing a separately transmitted signal from OLT 105, although for simplicity only optical splitter 110 is shown in FIG. 1. The optical splitter 110 is often located in an outside plant, such as a street cabinet that is not part of the CO. It is preferably located relatively closer to the ONTs it serves to minimize the length of the individual cable runs to each ONT.

The content transmitted by OLT 105 to each ONT is not identical, of course, so a TDM scheme is used in the downstream direction, with data addressed to each individual ONT, or in some cases groups of ONTs, sent at a different time. As should be apparent from FIG. 1, however, each ONT 115a through 115n receives the same transmission, but is configured to select its own data based on the destination address included in the transmitted packets.

In the upstream direction, data from each ONT is sent according to a time schedule set by the OLT 105 according to a TDMA transmission scheme. Upstream transmissions are typically carried by a different wavelength of light so as not to interfere with the downstream transmissions as the same optical fibers are used for traffic in both directions. The upstream transmissions from each ONT 115a through 115n arrive at optical splitter 110, which in this direction acts as a combiner for directing the transmitted signal on the fiber returning to the OLT 105.

As might be expected, the communications are usually formatted according to a standard protocol, for example, ITU-T G.984 (GPON) or IEEE 802.3ah (EPON). Most PONs use non-modulated, baseband NRZ signaling for transmissions over the optical fiber.

The ONTs 115a though 115n process the received downstream data traffic and provide to their respective subscriber networks the data from the OLT 105 that is intended for them. They also receive subscriber-network upstream traffic and transmit to the OLT 105 during an assigned time period. The ONT is a demarcation point between the PON and the subscriber network. An exemplary subscriber network is shown in FIG. 2. FIG. 2 is a simplified schematic diagram illustrating selected components of a typical subscriber network 130 according to the existing art.

In network 130 of FIG. 2, ONT 115a is connected to a media gateway 135, which in turn communicates with a number of subscriber devices. These connections are frequently though not universally implemented using coaxial or Cat 5 cables, or by simple copper wires. The type and number of these devices may vary widely, but shown here are a VoIP (voice over Internet Protocol) telephone 140 and a PC (personal computer) 155 such as are currently found in many homes. Also present is a wireless router 160 for communicating over radio channels according to a short-range protocol such as Wi-Fi with, in this example, a laptop 165 and an electronic tablet device 170. A set-top box 145 communicates with media gateway 135 to receive video programming for display on TV (television) 150. Set-top box 145 may perform channel-changing functions as well as video decompression and recording.

The media gateway 135 shown in FIG. 2 is capable of performing a variety of functions including routing, packet switching, firewall protection, and signal processing for VoIP telephone 140. Of course, not all of the devices shown in FIG. 2 are used by all subscribers, and so the functions actually performed by the media gateway will vary from location to location. On the other hand, the use of a single access network for providing a variety of services is growing in popularity. Other devices not shown in FIG. 2 may also be present in subscriber network 130, and its composition is not necessarily static; devices may be added and subtracted on a regular basis.

As mentioned above, the ONT 115a serves as a demarcation point between the PON 100 shown in FIG. 1 and the subscriber network 130 shown in FIG. 2. In this capacity, the ONT is also used for discovery and ranging procedures. Using an agreed protocol, the OLT and ONTs exchange messages so that the OLT can discover which ONTs are operational and connected to the PON, and also their respective distances from the OLT in terms of transmission time. This information is used, for example, for properly allocating bandwidth for upstream transmissions.

The PON is referred to as "passive" because there are no network elements between the OLT and the CPE that consume power; the optical splitter or splitters that divide the downstream traffic and combine the upstream traffic are passive devices. The energy consumed by the ONT and other subscriber equipment at the CPE end is substantial, however, and it is increasing as advancements in PON technology have increased the maximum bit rate. In some cases, the increase in energy consumption proportionally exceeds the increase in capacity. Some solutions have been proposed, such as reducing ONT functionality during battery-powered operation or going to a reduced-power state during scheduled intervals without data traffic.

Needed, however, is a way to reduce power consumption during such times, and in periods of normal operation as well. This need and other needs relating to PON networks are answered by the present invention.

SUMMARY

The present invention is directed to a manner of providing and energy-efficient two-stage PON using a multistage-PON repeater to forward data traffic and other communications between the first stage and the second stage.

In one aspect, the present invention is a repeater for a multi-stage optical network, including a CDR module for recovering a transmitted clock, a frame synchronization module for synchronizing incoming data traffic; and a decimator for identifying data in a downstream BI-PON frame that is intended for the repeater. The repeater may further include a bandwidth allocation parser for parsing the bandwidth allocation contained in a downstream bandwidth map field of the downstream BI-PON frame. The decimator may identify the data based on input from the frame synchronization module or the bandwidth allocation parser or both.

In a preferred embodiment the bandwidth allocation parser operates at a slower clock speed than the CDR. Other components may operate at this slower speed as well, including the frame synchronization module if a plurality of bit-interleaved sync words are used (instead of a single sync word) in the BI-PON transmission frame. In this case, the frame synchronization module detects a frame word and a repeater_id for calculating the offset used by the decimator in identifying data intended for the repeater. The slower clock speed is a division of the recovered clock.

In another aspect, the present invention is a multistage optical network, including a first stage having an OLT and at least one optical splitter for dividing and combining optical signals, a multistage-PON repeater for receiving downstream transmissions via the first stage, and at second stage comprising at least one second stage end device; wherein the multistage-PON repeater comprises a decimator for decimating the payload portion of a downstream BI-PON frame from the OLT. The PON second stage may include a plurality of second stage end devices and a second stage optical splitter for distributing a downstream transmission to the end devices. Second stage end devices may include, for example a VoIP telephone or a radio head.

In yet another aspect, the present invention is a method for operating a multistage-PON repeater in a two-stage PON, including receiving a first stage BI-PON transmission frame from an OLT, decimating the first stage frame by a decimator to identify the data intended for end devices associated with the multistage PON repeater, assembling a second stage BI-PON transmission frame from the identified data, and transmitting the assembled frame to the second stage. The method may further include receiving a first stage discovery request from the OLT and responding to the request. It may also include receiving a second stage discovery request from the OLT, forwarding the second stage discovery request to the second stage, and forwarding any received second stage discovery request responses to the OLT. The method may also include receiving an upstream transmission from the second stage, buffering the received frame, and forwarding the received frame to the OLT according to a bandwidth allocation schedule contained in the BI-PON transmission frame.

The method may include detecting a sync word for achieving header sync. In some embodiments, the sync word is one of a plurality of sync words bit that interleaved into the transmission frame and further comprising comparing a repeater_id associated with the sync word with the id of the multistage-PON repeater to determine if there is a match. In these embodiments, the method may further include, if the repeater_id associated with the sync word does not match the id of the multistage-PON, calculating an offset value an adjusting a phase value for the decimator after calculating the offset value Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present invention is directed to an apparatus and method for an energy-efficient multi-stage PON. In a preferred embodiment, it will be implemented as a two-stage PON using bit-interleaved frames in the downstream direction and an analogous transmission scheme in the upstream direction.

A significant portion of the expected energy savings is realized by replacement of the ONT with a multistage-PON repeater, creating a two-stage PON that includes CPE equipment. A standard ONT will now be described for purposes of comparison.

Figure 3:
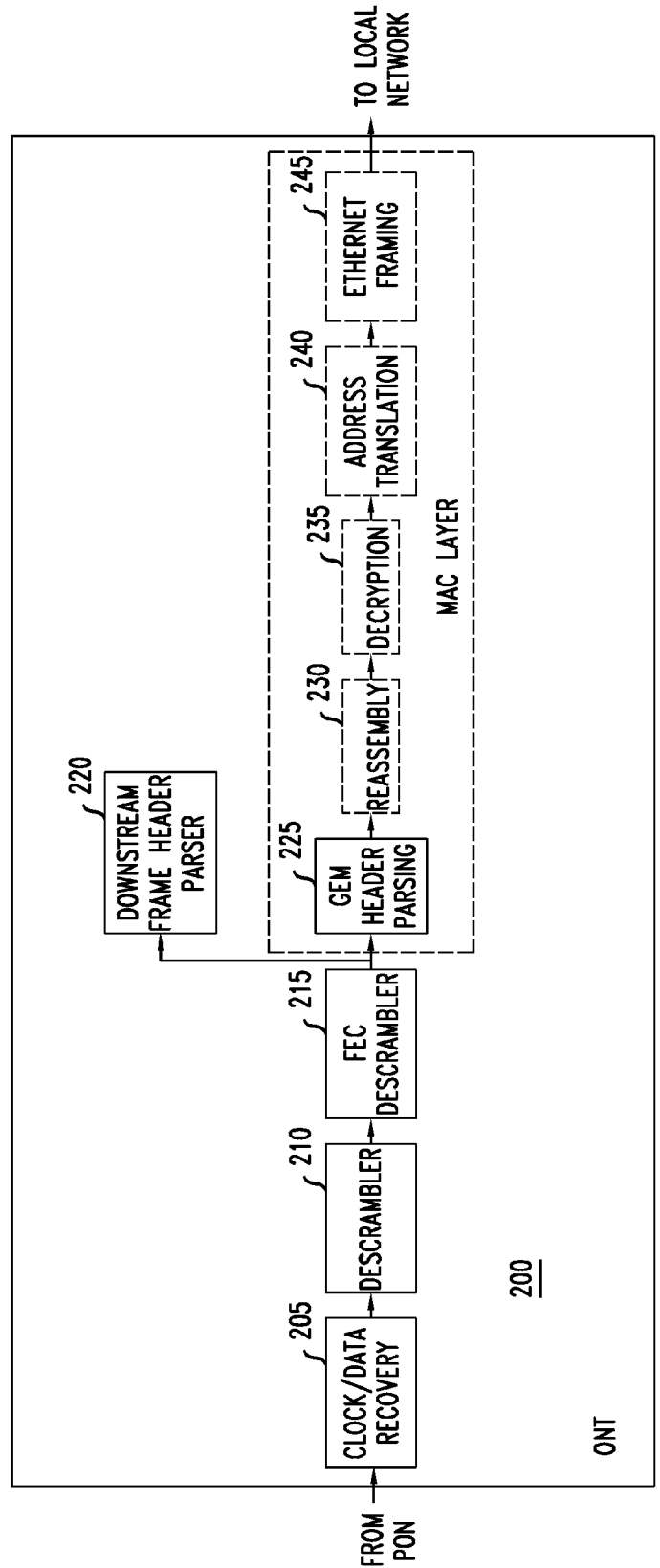
FIG. 3 is a simplified block diagram illustrating selected components of a typical PON ONT according to the existing art.

FIG. 3 is a simplified block diagram illustrating selected components of a typical PON ONT 200 according to the existing art. Specifically, components for processing downstream traffic are shown. The emphasis in the present invention is on downstream traffic as the greatest energy savings are expected to be realized here, where transmission is more or less continuous—as opposed to upstream traffic which tends to be bursty in nature. The components illustrated in FIG. 3 are associated with the ITU-T GPON and more recent 10G GPON standards.

Each component in FIG. 3 is implemented as hardware or in some cases software executing on a hardware platform. Although each functional component is shown as a separate unit within ONT 200, in some implementations one or more component may reside on a single physical unit such as a chip. By the same token a single component may be arranged to reside in part on two or more physical units.

As shown in FIG. 3, downstream traffic arriving at the ONT 200 from the PON (not shown) enters the CDR (clock/data recovery module) 205 to recover timing information from the incoming signal. It then is passed to the descrambler 210 for descrambling, FEC (forward error correction) decoder module 215, and downstream frame header parser 220.

Also shown in FIG. 3 are MAC layer processing modules including a GEM header parsing module 225. Note that that remaining MAC layer components are represented using a broken line, indicating that they do not process all downstream traffic received from the OLT, but only that traffic that has now been identified as being associated with ONT 200 and its respective subscriber network components. These remaining MAC layer processing components include reassembly module 230, decryption module 235, address translation module 240, and an Ethernet framing module 245. The data traffic processed in this manner is then provided to the local subscriber network associated with ONT 200.

As mentioned above, the ONT is positioned between the PON access network and the subscriber network. In contrast, the present invention employs a multistage-PON repeater to create in effect a two-stage PON network that encompasses the entire data path from the OLT to the individual subscriber devices. Substantial energy savings are expected from this new configuration. A two-stage PON of this type is illustrated in FIG. 4.

Figure 4:
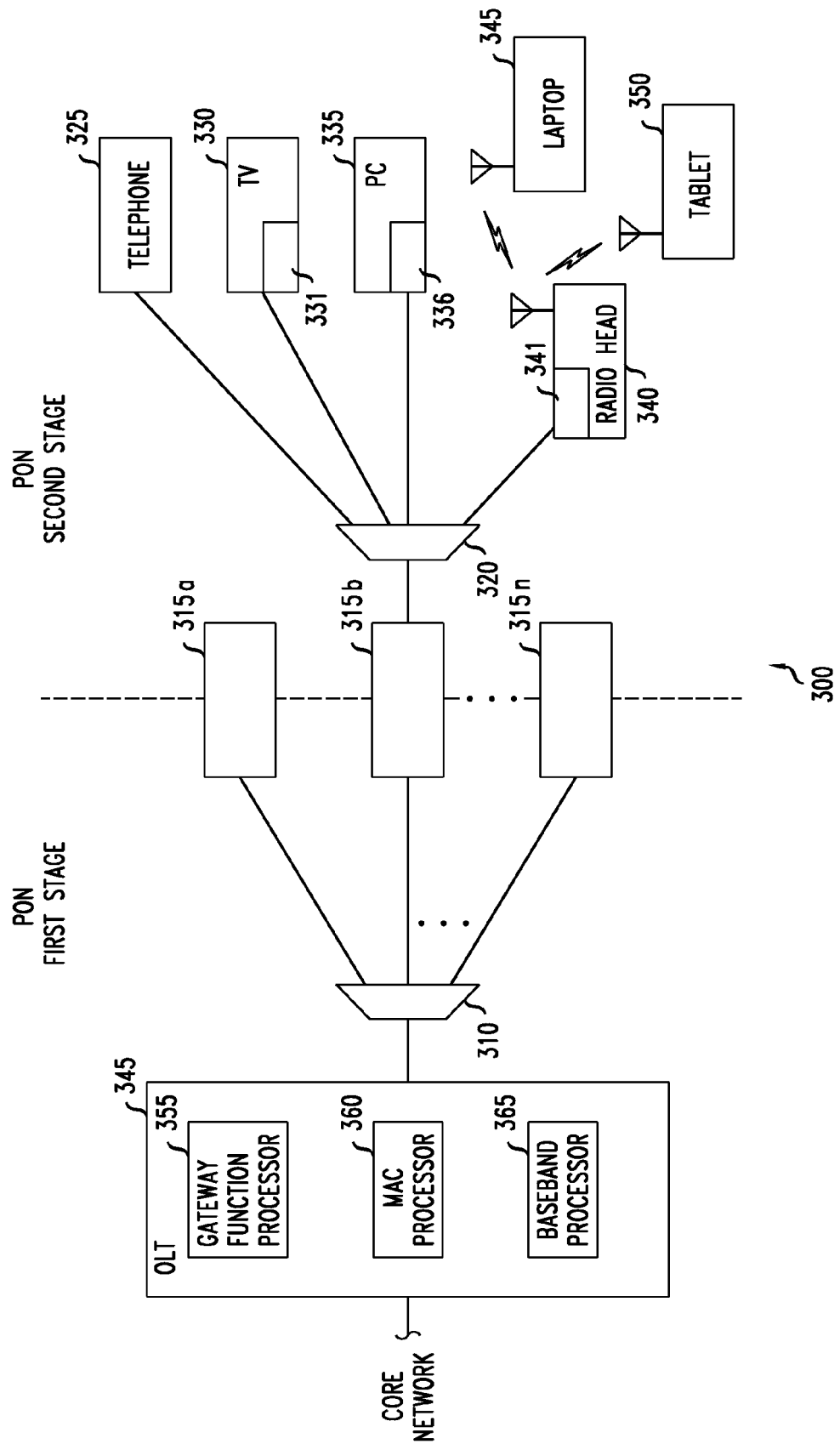
FIG. 4 is a simplified schematic diagram illustrating selected components of a two-stage PON according to an embodiment of the present invention.

FIG. 4 is a simplified schematic diagram illustrating selected components of a two-stage PON 300 according to an embodiment of the present invention. In this embodiment, OLT 305 is positioned between PON 300 and a core network (not shown), and in most implementations will handle communications for a great many subscribers. In FIG. 4, OOT 305 includes a MAC processor 360 for support in handling the MAC layer associated with these communications.

Figure 1:
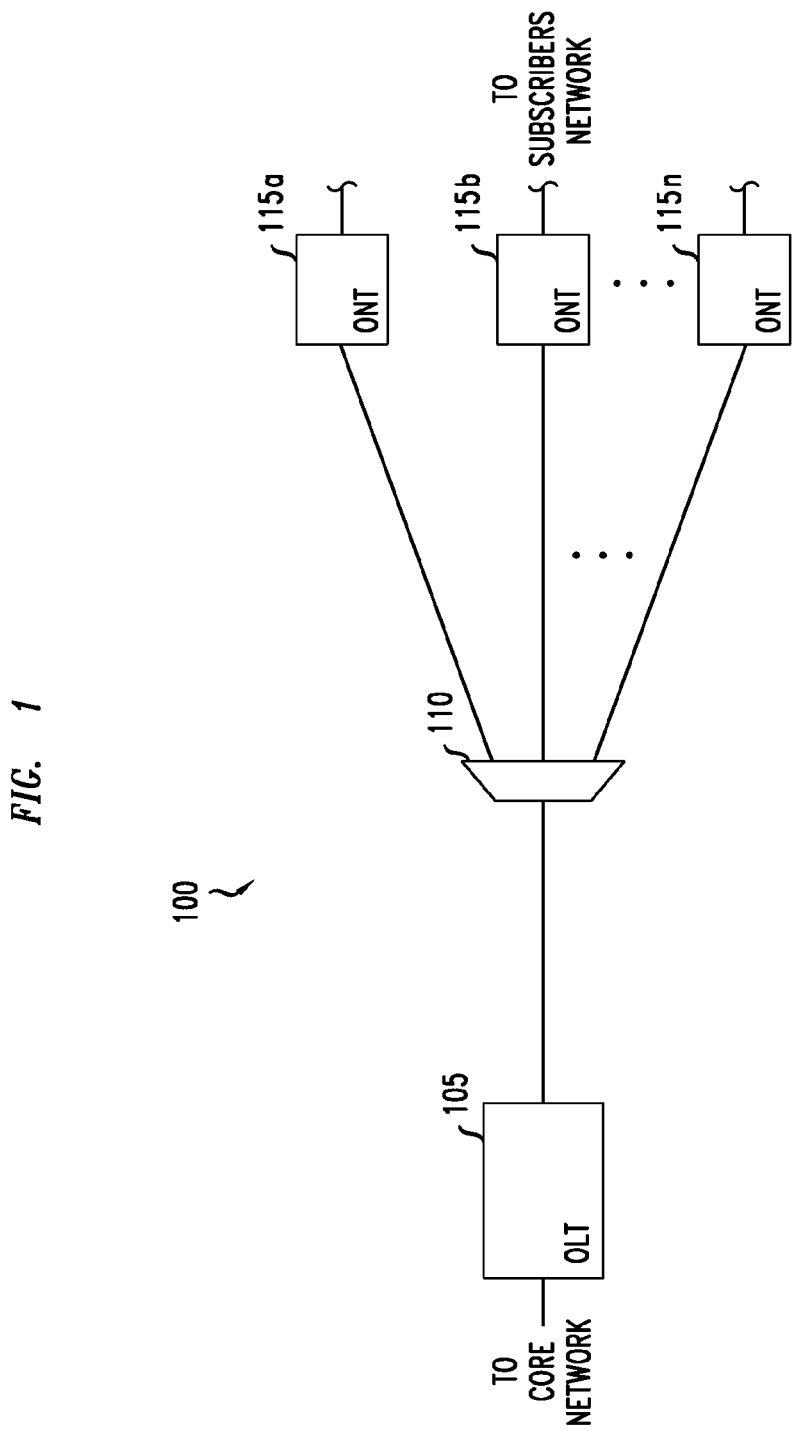
FIG. 1 is a simplified schematic diagram illustrating selected components of a typical PON according to the existing art.

In the embodiment of FIG. 4, multistage-PON repeater 315b is positioned between the first stage and second stage of PON 300. As with the ONT 115a shown in FIGS. 1 and 2, the multistage-PON repeater 315b is typically positioned at the subscriber's premises and may therefore be considered CPE. OLT 305 communicates with multi-stage PON repeater 315b via an optical splitter 310. Optical splitter 310 distributes signals transmitted downstream from OLT 305 to multistage-PON repeaters 315a through 315n and combines upstream signals transmitted from them. As implied in FIG. 4, there may be any number of multistage-PON repeaters associated with optical splitter 310. Likewise, there may be and typically are additional optical splitters in communication with OLT 305 by respective fiber optical cables.

As with a standard GPON, optical splitter 310 is a passive device and is frequently positioned in an outside plant such as a street cabinet. Note that in some implementations, optical splitter 310 may be representative of a plurality of such devices arranged in series to accommodate distributing the optical signal to a large number of downstream fibers.

In the embodiment of FIG. 4, two-stage PON 300 includes a second-stage optical splitter 320 positioned downstream of multistage repeater 315b. As should be apparent from FIG. 4, optical splitter 320 distributes downstream signals to and combines upstream transmissions from the various end devices in the second stage. In this embodiment the second-stage PON employs fiber optic cable to each of the end devices (via second stage splitter 320) from the multi-stage PON repeater 315a.

Figure 2:
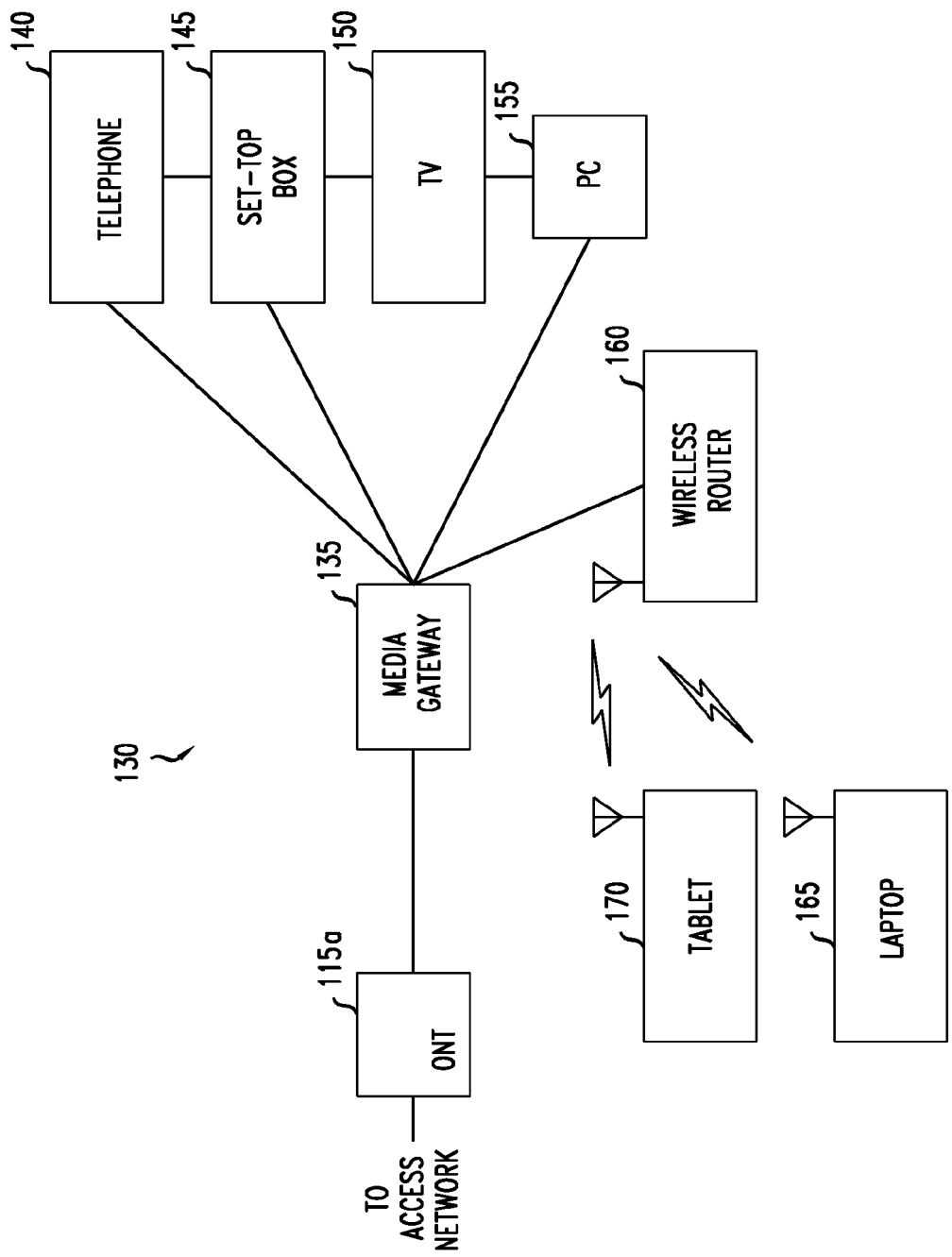
FIG. 2 is a simplified schematic diagram illustrating selected components of a typical subscriber network according to the existing art.

Similar to the subscriber network 130 of FIG. 2, the second stage of PON 300 includes a telephone 325, a TV 330, and a PC 335. In the embodiment of FIG. 4, there is no set-top box associated with the TV 330. The functions previously performed by the set-top box are instead performed in the OLT 305 or in a server in communication with the OLT, which is preferably located within the CO. The TV 330 in this embodiment does include what will be referred to herein as a mini-ONT 331 for performing the processing necessary to select the portion of the data payload intended and formatted for use by TV 300. Note that the TV 330 will not receive all of the traffic transmitted on the PON first stage by OLT 305, but will receive via the PON second stage a frame including all data for the active subscriber end devices in the PON second stage, from which it will identify traffic intended for the TV 330.

In the embodiment of FIG. 4, PC 335 also includes a mini-ONT 336 for performing analogous functions. In one embodiment, PC 335 operates as a thin client and communicates with OLT 305 for all processing and memory functions. Of course, the ability of PC 335 to operate in this fashion does not preclude the ability to perform these functions on its own as well.

In the same fashion, the wireless router or access point shown in FIG. 2 is, in the embodiment of FIG. 4, simply a radio head for short range radio transmission of communications to and from lap-top 345 and electronic tablet 350. Although in this capacity radio head 340 need not perform all the functions of a wireless router, it may of course be capable of doing so in a different environment. In essence, OLT 305 communicates more directly with laptop 345 and tablet 350, using radio head 340 to handle radio communications to these wireless devices. In this embodiment, radio head 340 includes a mini-ONT 341 for selecting the portion of the data stream intended for radio transmission to these devices.

In this embodiment, baseband processor 365 performs functions normally performed by a WiFi or other wireless access point including, for example, multiple access control, modulation and demodulation, RF power control, channel control, authentication and security. Naturally, all or each of these functions are not a requirement of the present invention unless recited in a particular embodiment, but significant energy savings at the subscriber premises may be expected if as much functionality as possible is relegated to the CO. And centralization of such functions in the CO may be expected to improve overall efficiency.

Here it is noted that virtualization of wireless access points does result in a higher PON traffic level compared to that associated with the conventional wireless access point with Ethernet uplink. The energy penalty associated with transporting additional bits over the two-stage PON is negligible, however, compared with the energy saved through virtualization and more efficient resource sharing of the WAP functions at the CO.

Similar considerations apply for other subscriber end devices. As should be apparent in the embodiment of FIG. 4, many of the functions previously performed within the subscriber network have been relegated to the OLT 305 or to a separate server (not shown) in communication with the OLT and preferably located in the CO. This will herein be referred to as "virtualizing" an end device. Note, however, that completely virtualizing each end device is not a requirement of the present invention unless explicitly recited in a particular embodiment. The virtualization of end devices, however, does allow for significant energy savings at the subscriber premises. And while relegating many of the end-device functions may increase energy consumption at the CO, it may be possible to achieve greater efficiencies do to the handling at one central location of the same function or functions for a great many subscriber end devices.

In the embodiment of FIG. 4, the virtualization of the second stage PON end devices has eliminated the need for a local media gateway. Functions previously performed by the media gateway, including packet routing between the local subscriber network and the core network, packet switching within the subscriber network, network address translation and dynamic address allocation may be relegated to a gateway function processor, such as gateway function processor 335 shown in FIG. 4. (There may be more than one in the CO.) This eliminates the energy required by a local media gateway even at times of low traffic to and from the subscriber network.

Although similarly positioned, the multistage-PON repeater differs from a standard GPON ONT (as it depicted in FIG. 3) or analogous EPON device in the manner is which it is configured and the way it handles data traffic. It is noted, however, that the difference does not arise from the exact label used to describe the device. In addition, it is within contemplation that a single apparatus may perform both functions but be set to perform one or the other in a particular environment. It is also possible that an existing ONT could be modified to handle data traffic in accordance with the present invention.

Figure 5:
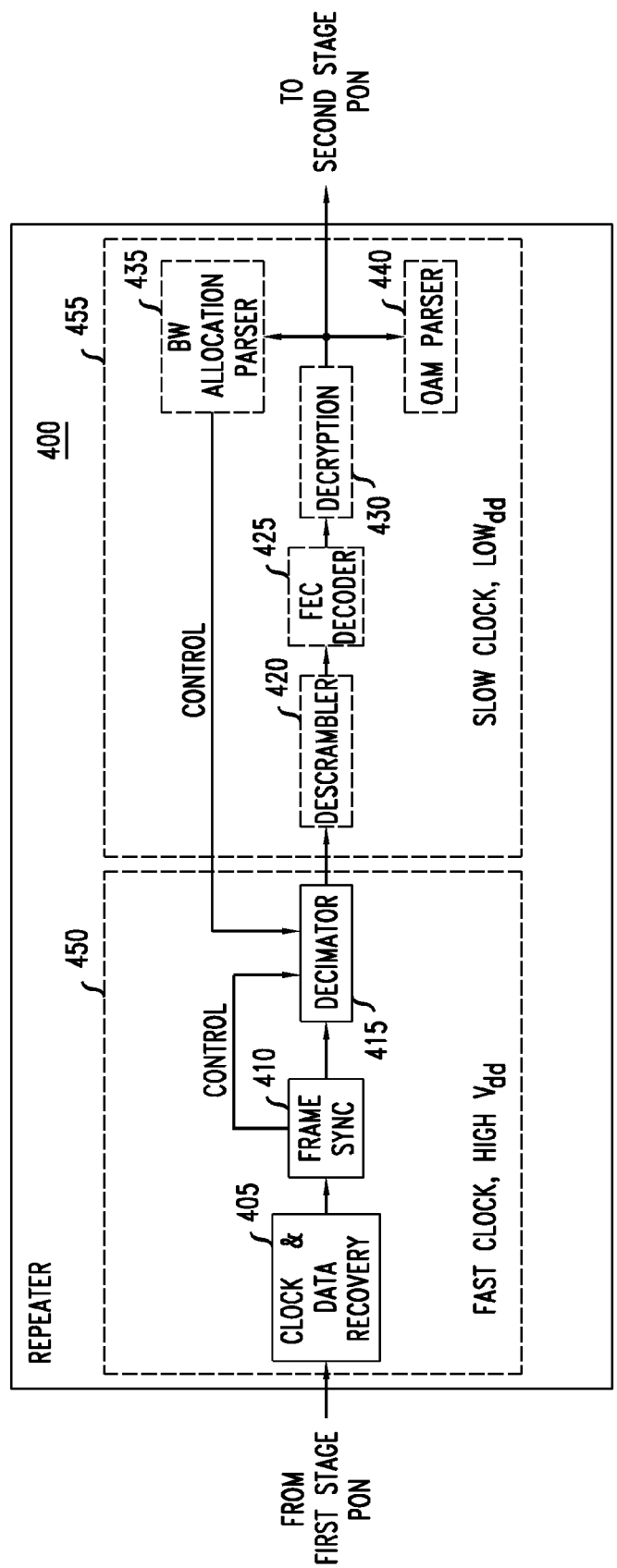
FIG. 5 is a simplified block diagram illustrating selected components of a multistage-PON repeater according to an embodiment of the present invention.

The repeater and its operation may now be described in more detail. FIG. 5 is a simplified block diagram illustrating selected components of a multistage-PON repeater 400 according to an embodiment of the present invention. Specifically, the components depicted in FIG. 5 are involved in downstream traffic processing. Initially, it is noted that some components 450 of multistage-PON repeater operate according to a fast clock while other components 455 may operate according to a relatively-slower clock. The faster clock of course is dictated by the speed of the PON first stage, while they slower clock, a division of the fast clock, may operate at a rate suitable for the second stage PON to which data traffic is being forwarded. This may be referred to herein as rate adaption.

Each component in FIG. 5 is implemented as hardware or in some cases software executing on a hardware platform. Although each functional component is shown as a separate unit within multistage-PON repeater 400, in some implementations one or more component may reside on a single physical unit such as a chip. By the same token a single component may be arranged to reside in part on two or more physical units.

A component that must operate at the fast clock speed is the CDR module 405, which receives the data traffic as it arrives from the PON first stage. In the embodiment of FIG. 5, the frame sync module 410 receives the data from the CDR module 405 and then provides the data to decimator 415 along with a control signal so that decimator 415 may operate on the data stream beginning at the correct bit.

In an alternate embodiment (not shown), frame sync is performed at the relatively-slower clock speed by reading each $n^{th}$ bit until a sync word is detected, with n corresponding to the number of repeaters (or ONTs or ONUs) participating in the BI-PON frame transmission. In this embodiment, a plurality of bit-interleaved sync words are used in the downstream frame, with each sync word including, for example, a 32 bit pattern followed by a repeater_id value. When the multistage-PON repeater sync module detects a word, it uses the associated repeater_id to calculate an offset for reading its own information. In accordance with the present invention, decimator 415 is extracts for further processing the bits that are intended for the PON second stage associated with multistage-PON 400. Data not intended for this PON second stage may be discarded at this point. Rather than examining header addresses, however, decimator 415 extracts the bits according to knowledge of the bit interleaving scheme under which the data was transmitted. This scheme will be described in further detail below.

In the embodiment if FIG. 5, the components 455 not only operate at a lower clock speed but operate only on data that will be forwarded to the PON second stage. These components include descrambler 420, FEC decoder 425, and decryption module 430. By operating at a lower clock speed for these functions, multistage-PON repeater 400 is expected to operate at a lower supply voltage $V_{dd}$, and of course further energy savings compared with standard ONT operation is expected due to the greatly-reduced processing of data not intended for the PON second stage associated with the multistage-PON repeater 400.

In addition, in this embodiment the need for MAC processing such as that performed by the standard ONT is largely eliminated. This may include such MAC operations as reassembly, payload definition, and parsing of the GEM header and reframing the payload packets. The extracted data traffic may be formatted in the OLT in a manner suitable for each respective end device to which the downstream traffic is being directed. In a sense, the multistage-PON repeater 400 can be said to be forwarding raw bits of data in a largely protocol-agnostic manner.

Finally, in the embodiment of FIG. 5, the multistage-PON includes a bandwidth (BW) allocation parser 435 for parsing bandwidth allocation information provided in the data stream from the OLT and providing a control signal to the decimator indicating, for example, the length of the data payload in a received frame. OAM information is also included in the data stream, and in this embodiment it is parsed by OAM parser 440.

Note that the configuration illustrated in FIG. 5 is exemplary and other configurations may be implemented within the scope of the present invention as well.

Figure 6:
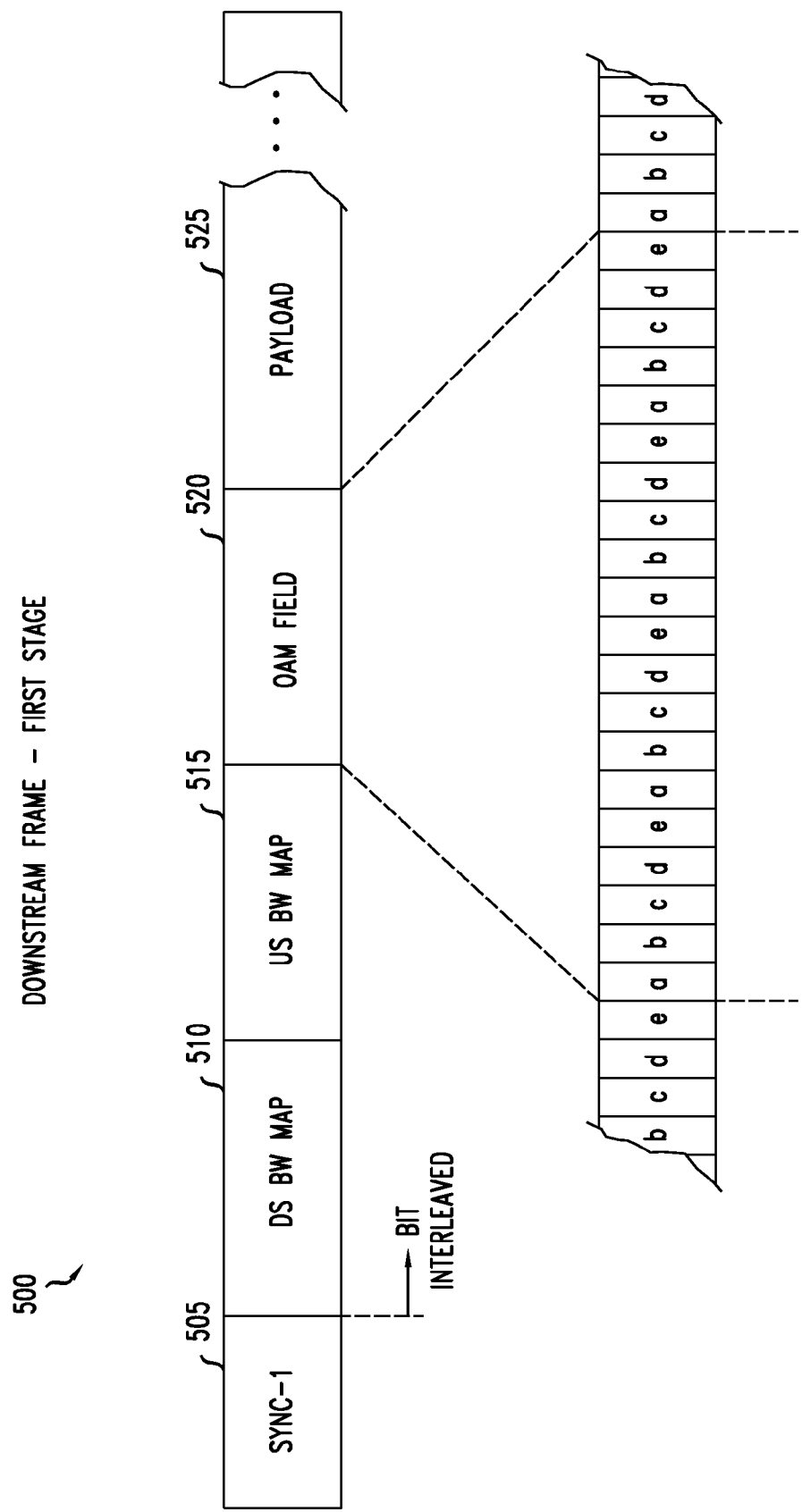
FIG. 6 illustrates a downstream data frame structure according to an embodiment of the present invention.

As mentioned above, the present invention advantageously implements a TDM bit-interleaved scheme in at least the downstream direction. This will be referred to as BI-PON. This scheme will now be described in greater detail. FIG. 6 illustrates a downstream data frame structure 500 according to an embodiment of the present invention. Data frames of this type are assembled for the PON first stage. The frame 500 includes a sync-1 field 505, which contains a synchronization word. The remainder of frame 500 uses bit interleaving to provide data for each multistage-PON repeater operating in the PON first stage. (Note that this is still referred to as a BI-PON frame.)

In an alternate embodiment the sync-1 word of field 505 may be replaced by bit-interleaved sync words, with each sync word including a sync pattern followed by a repeater_id value. (See, for example, FIG. 11, discussed below.)

A bit-interleaving example is shown in FIG. 6 by expanding the OAM field 520 for illustration. Bits for each of multistage PON repeaters a through e are interleaved in a defined sequence. Each multistage-PON repeater is aware of its place in the sequence and reads only those bits of frame 500 that appear in that frame position. The bits intended for other multistage-PON repeaters are not used and are discarded.

Note that the five sequential positions, associated with multi-stage-PON repeaters a through e are used for illustration. In an actual implementation, there may be many more positions in the sequence and of course the fields will contain many more bits of information. An exemplary PON may include 128 multistage-PON repeaters. In this case if a particular repeater is assigned a position of $54^{th}$ in the bit sequence, it will read every $128^{th}$ bit of the interleaved portion of the frame, starting with the $54^{th}$.

The multistage-PON repeater may be made aware of its position in the bit sequence in a number of ways, for example during the discovery and ranging procedure when the OLT determines which repeaters are operational. In other embodiments, the repeater's positioning for the bit stream may be programmed at the time of manufacture or installation for example using flash memory or setting mechanical switches.

In the embodiment of FIG. 6, frame 500 includes in order after the sync-1 field 505, a downstream bandwidth map 510, and upstream bandwidth map 515 and an OAM information field 520. Each of fields 510, 515, and 520 are of constant length and read by the repeater in accordance with its assigned position in the sequence. The payload field 525, which in this embodiment follows the OAM information field 520, is read according to information provided in the downstream bandwidth map 510.

In this embodiment, the bits of downstream bandwidth map 510 allocated to a given multistage-PON repeater form at least three additional fields (not separately shown), namely a flags field, a rate field, and an offset field. Optionally, a start field and a stop field may also be present.

The flags field of the downstream bandwidth map 510 indicates how the allocation specified in the downstream bandwidth map 510 is to be interpreted. For example, different values of the flags field may, for example, have the following four meanings:

flags=0→no change from the previous allocation;
flags=1→reduce the previous allocation by elimination of a specified part;
flags=2→add a specified part to the current allocation,
flags=3→replace the previous allocation with a specified one.

By convention, the bandwidth map 510 may become valid in the same, the next, or one of the following frame periods.

The rate field in the downstream bandwidth map determines the decimation rate for the allocation assigned to an ONT. For example, number 64 specified in this field means that the ONT should read every $64^{th}$ bit of the payload section.

The offset field in the downstream bandwidth map specifies the bit offset from the beginning of the payload section from which the corresponding ONT should start sampling bits according to the value of the rate field.

The start and stop fields, if used, may indicate a "word offset" (the word size being specified by the rate field) from the beginning of the downstream frame at which the repeater should start and stop receiving bits associated with this allocation.

The described bandwidth map allows flexible and dynamic allocation of bandwidth in the bit-interleaved TDM PON. It also provides a simple mechanism for delivery of multicast traffic, whereby each subscriber participating in a multicast group shares a certain part of the bandwidth assigned to it with other members of the multicast group. For example, if repeaters RPT1, RPT5 and RPT37 were to be added to some multicast group that is receiving content transmitted once in every 1000 bits with an offset of 512 bits, the bandwidth map in the following downstream frame should include identical allocations for all three of them, with fields (flags, rate, offset) being equal to (2, 1000, 512).

In the embodiment of FIG. 6, the upstream bandwidth map 515 follows the downstream bandwidth map 510. The upstream bandwidth map 515 is also bit interleaved and read by a multistage-PON repeater according to the assigned scheme. In this embodiment, however, upstream transmissions from the repeater are not bit interleaved but instead sent at times assigned by the OLT according to current practice. The upstream bandwidth allocation in the map may therefore follow, for example, the GPON standard (ITU-T 984.3), which would include when the transmission may start, the allowed length, and an allocation ID number. In accordance with the present invention, the multistage-PON repeater buffers upstream transmissions, if any, from each of the end devices it the PON second stage and forwards them to the OLT in accordance with allocation indicated in upstream bandwidth map 515.

In the embodiment of FIG. 6, The OAM message field 520 follows the upstream bandwidth map 515. The OAM message field 520, which again has fixed length, is sized to contain exactly one fixed-size OAM message for every repeater in the PON. The OAM messages are bit interleaved and extracted from the OAM field by individual multistage-PON repeaters in the same way as the allocations are extracted from the downstream bandwidth map. Note that this also contributes to the energy efficiency of the ONT in the bit-interleaved TDM PON because the ONT is able to receive OAM messages without parsing downstream payload.

Finally, in the embodiment of FIG. 6, first stage downstream frame 500 includes payload field 500, which is also bit-interleaved but read according to the allocation specified in the downstream bandwidth map. As mentioned above in relation to FIG. 5, the decimator 415 of the multistage-PON repeater receives control input from the frame synchronization module 410 and the bandwidth allocation parser 435 to determine how the payload bits intended for the repeater are identified.

Figure 7:
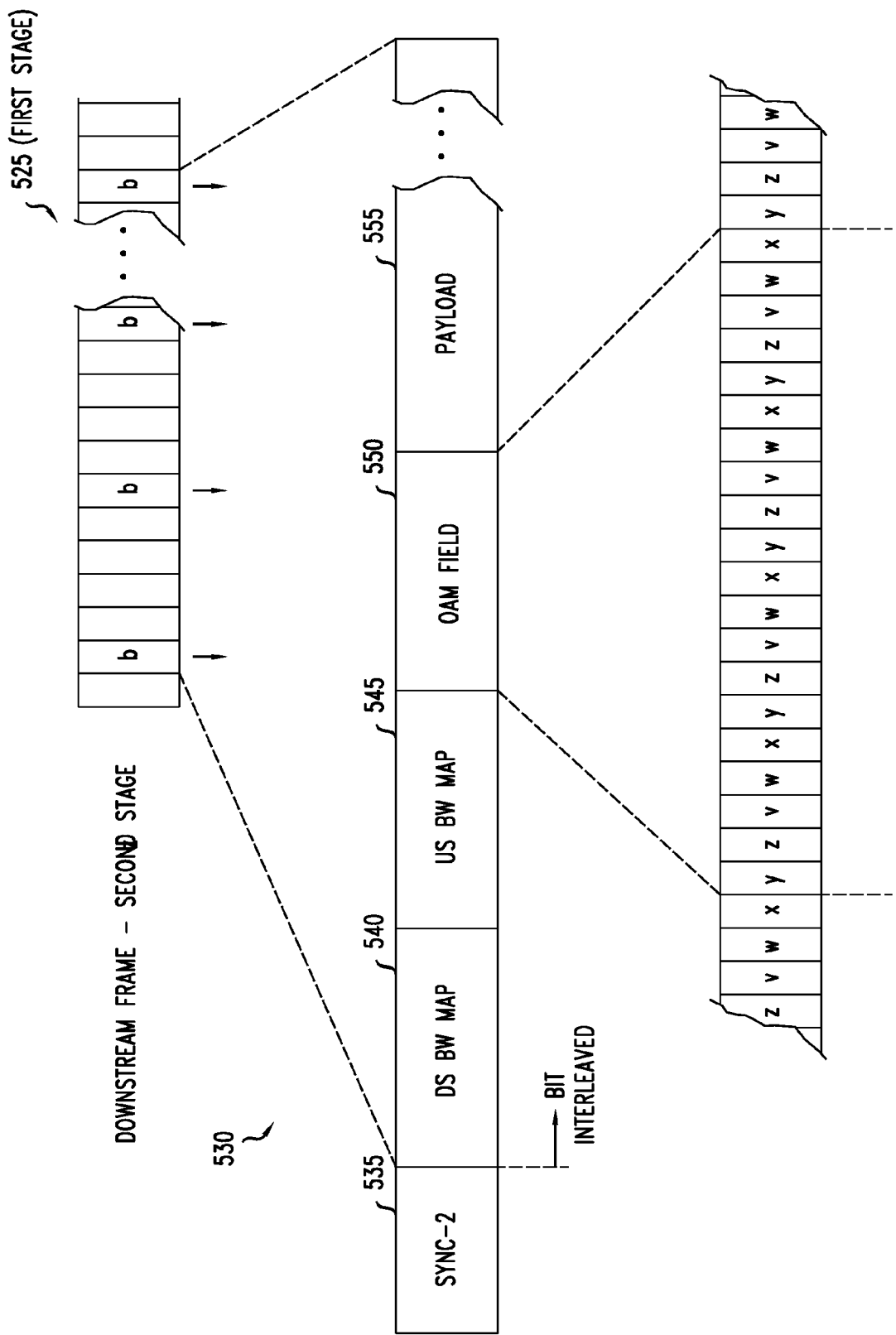
FIG. 7 illustrates a downstream data frame structure according to an embodiment of the present invention.

Downstream transmissions in the PON second stage, that is, transmissions from the multistage-PON repeater to the end devices, are structured similarly to those of the first stage, as shown in FIG. 7. FIG. 7 illustrates a downstream data frame structure 530 according to an embodiment of the present invention. As shown in FIG. 7, second-state downstream 530 begins with a synchronization word. This is inserted by the repeater, and contained in a field referred to as sync-2 field 535 to distinguish it from the sync-1 field 505 shown in FIG. 6.

In this embodiment, as illustrated in FIG. 7, the remainder of second-stage downstream frame 530 is taken from the portion of payload 525 (also shown in FIG. 6) allocated for the repeater, in this case multistage-PON repeater b. Note therefore, that this portion of the frame 530 was formed in the OLT and then bit interleaved with data for other repeaters in downstream frame 500. The assembly of the second stage downstream frame therefore comprises pre-pending the Sync-2 field onto the allocated portion of the first stage payload.

In the embodiment of FIG. 7, the frame 530 includes a downstream bandwidth map 540, and upstream bandwidth map 545, and OAM field 550, and a payload 555. The bit-interleaved portion of second stage downstream frame 530 contains information for each of the end devices. As an example, the OAM field 550 is expanded to shown the interleaving for end devices v through z. As with the first-stage downstream frame 500, the bandwidth map and OAM fields are of a constant size and read according to a set or adjustable assignment. The payload field 555, of course, may vary in length and is read according to an allocation set forth in the downstream bandwidth map 540.

Figure 8:
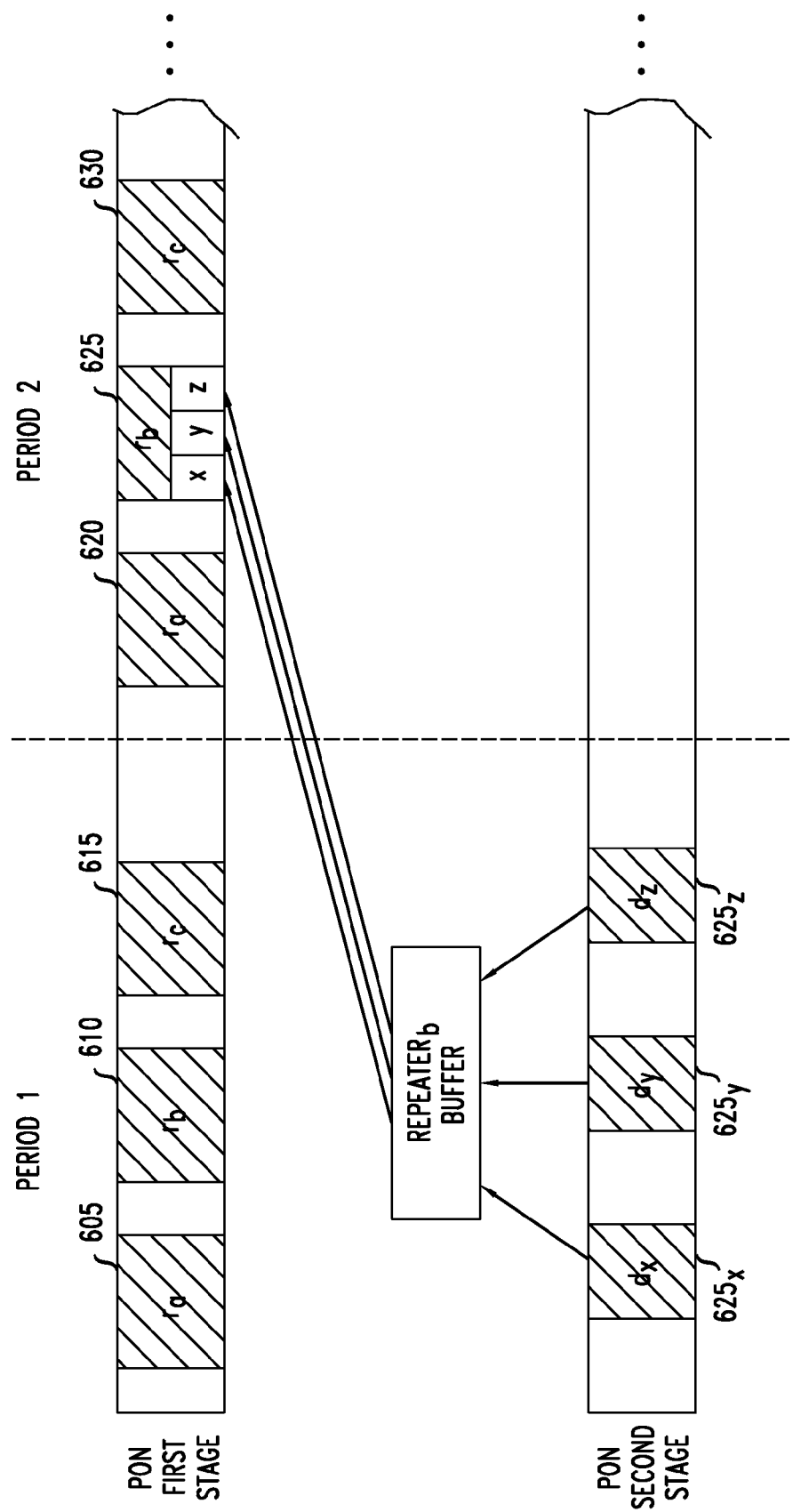
FIG. 8 illustrates an upstream transmission scheme according to an embodiment of the present invention.

FIG. 8 illustrates an upstream transmission scheme according to an embodiment of the present invention. As mentioned above, the upstream transmission allocation may be similar or identical to the transmission scheme associated with current GPON or EPON systems. That is, the multistage-PON repeater is assigned time slots for transmitting to the OLT any data that it has received from the end devices of the PON second stage. This is illustrated, for example, in the FIG. 8, Period 1 transmission allocation for the PON first stage. During the period one when the upstream transmissions are scheduled, there is a time slot 605 for transmissions from a first repeater, $r_a$. Time slots 610 and 615 are for the transmissions from repeaters $r_b$ and $r_c$, respectively. Likewise, during period two, time slots 620, 625, and 630 are allocated for $r_a$, $r_b$, and $r_c$, respectively.

In the embodiment of FIG. 8, end device transmissions have also been received at repeater $r_b$. Time slots $625_x$, $625_y$, and $625_z$ contain data from devices x, y, and z, respectively. This data is buffered in buffer $r_b$ associated with repeater $r_b$, so that it can be included in the time slot 625 allocated for repeater $r_b$ during Period 2. Note that in some cases, the Period 1 data from devices x, y, or z may have to be included in the $r_b$ upstream allocation in a later period (not shown) if the data to be transmitted exceeds a maximum allocation. It is preferred, however, that upstream transmission from the PON second state by transmitted to the OLT over the PON first stage in the next available time slot. Note that the second stage upstream data relating to repeaters $r_a$ and $r_b$ is not shown in FIG. 8.

As mentioned above, the configuration and transmission scheme of the present invention permit data to be formatted for an individual end device, such as a VoIP telephone. For another example, a bit stream representing a digitized analog RF wave form may be sent downstream to a radio head of the PON second stage. An example of such a device is illustrated in FIG. 9.

Figure 9:
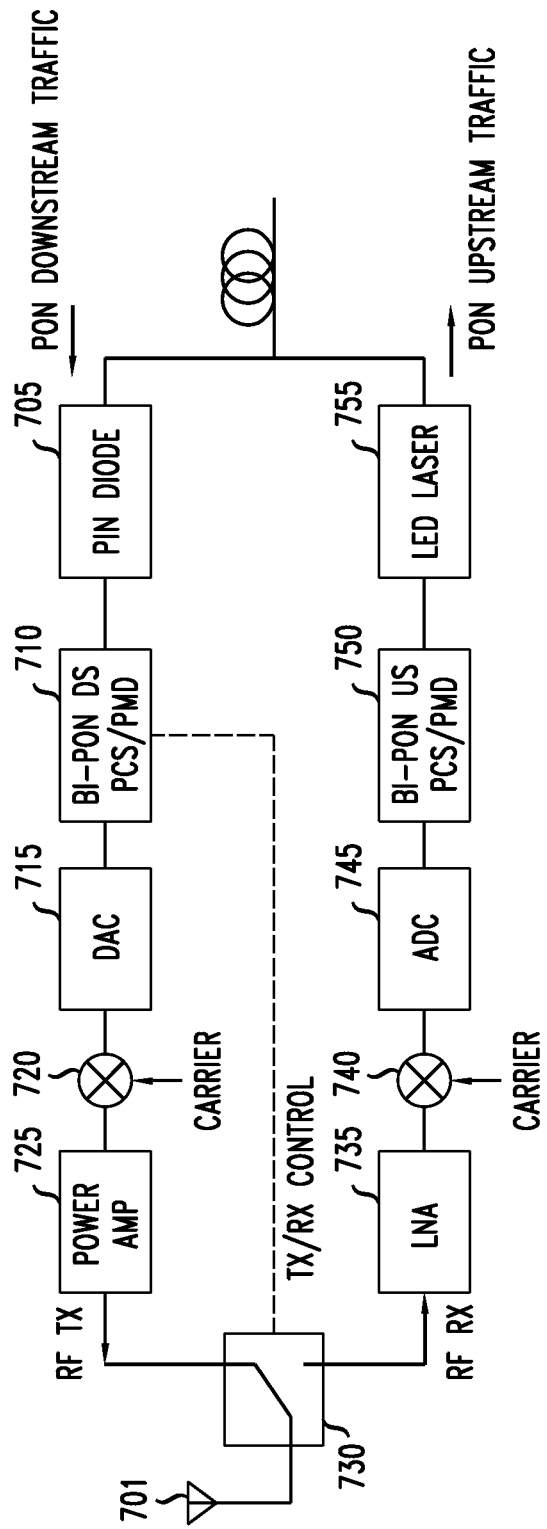
FIG. 9 is a simplified schematic diagram illustrating selected components of a radio head according to an embodiment of the present invention.

FIG. 9 is a simplified schematic diagram illustrating selected components of a radio head 700 according to an embodiment of the present invention. In the exemplary embodiment, radio head 700 includes a light signal detector such as PIN (p-type, intrinsic, n-type) diode 705. The signal from the stimulated PIN diode 705 is provided to BI-PON downstream PCS/PMD module 710, and then the digitized waveform is provided to digital-to-analog (DAC) converter 715. The resulting analog waveform is modulated with a carrier wave in modulator 720 and amplified by power amplifier 725 for transmission via antenna 731. Note that control of the transmission and reception function of antenna 731 is switched by switch 730 in response to a control signal form PCS/PMD module 710.

In this embodiment, the receive side operation of radio head 700 is analogous. An RF transmission, for example, from a laptop or electronic tablet are received at antenna 731 and passed through a low-noise amplifier (LNA) 735 before being demodulated in demodulator 740. The resulting analog waveform is digitized by analog-to-digital converter (ADC) 745. The data is then provided to BI-PON upstream PCS/PMD module 750 before being transmitted according to the assigned allocation scheme by a light source such as LED 755. The data is then buffered and transmitted to the OLT by a multistage-PON repeater as illustrated, for example in FIG. 8.

Figure 10:
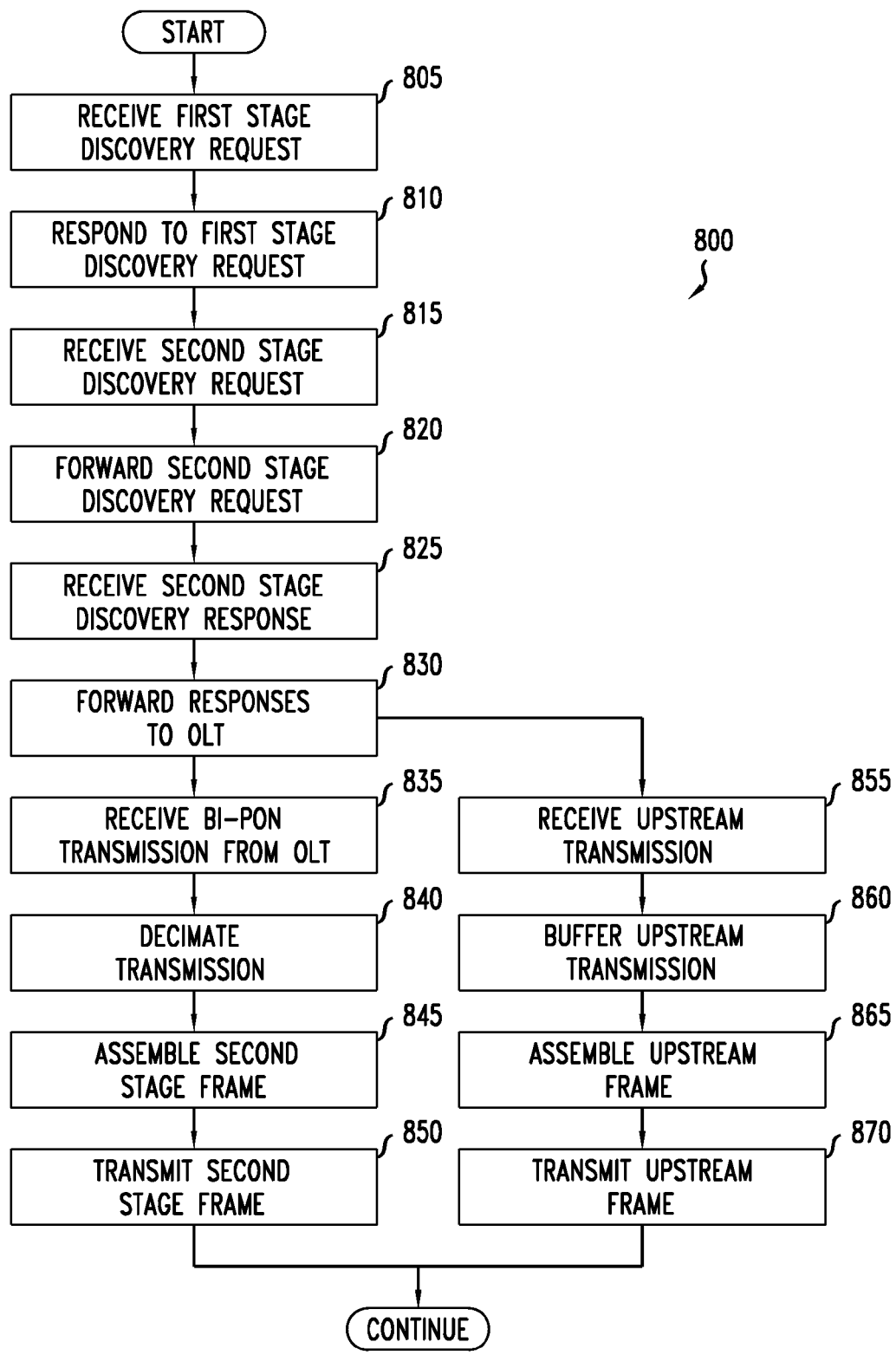
FIG. 10 is a flow diagram illustrating a method according to an embodiment of the present invention.

FIG. 10 is a flow diagram illustrating a method 800 according to an embodiment of the present invention. At START it is presumed that the components necessary to performing the method 800 are available and operational according to this embodiment. The process then begins with receiving (step 805) and responding (step 810) by the multistage-PON repeater to a discovery and ranging request from the OLT. As with a GPON ONT, for example, this operation permits the OLT to determine which repeaters are active and assess the distance to them in terms of transmission time. The repeater then receives (step 815) a PON second stage discovery request from the OLT and forwards (step 820) the request to the end devices in its second stage. When the multistage-PON repeater receives (step 825) a response to the second stage discovery request, it forwards the request (step 830) to the OLT. Note that ranging is not necessary for second stage discovery requests.

In the embodiment of FIG. 10, the process continues when the multistage-PON repeater receives (step 835) a bit-interleaved transmission from the OLT via a PON first stage. The received transmission is then decimated (step 840) to identify those portion of the transmission that are intended for the multistage-PON repeater, and the remainder of the transmission is discarded (not shown).

In this embodiment, the multistage-PON repeater then assembles (step 845) second stage downstream frames from the portion of the PON first stage transmission that are identified during decimation at step 840. The second stage downstream frames are then transmitted (step 850) to the end devices associated with the multistage-PON repeater over a PON second stage.

In the embodiment of FIG. 10, the method 800 also includes receiving upstream transmissions (step 855) from one or more end device of the PON second stage associated with the multistage-PON repeater. The received transmissions are buffered (step 860). At the time allocated for upstream transmissions from the multistage-PON repeater, the buffered second stage transmissions are formed (step 865) into an upstream transmission frame and transmitted (step 870) to the OLT via the PON first stage.

Figure 11:
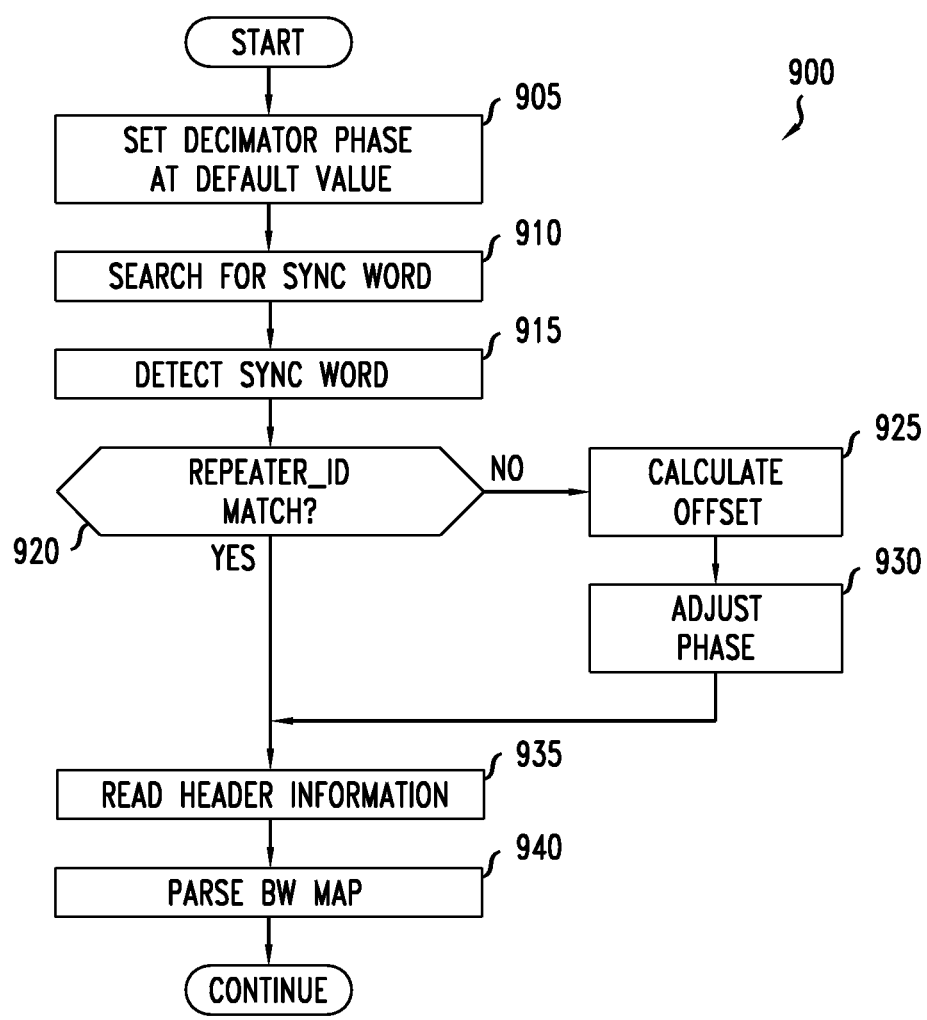
FIG. 11 is a flow diagram illustrating a method according to an alternate embodiment of the present invention.

FIG. 11 is a flow diagram illustrating a method 900 according to an alternate embodiment of the present invention. At START it is presumed that the components necessary to performing the method 900 are available and operational according to this embodiment. It is further presumed that the sync-1 field of the first stage downstream frame is populated with n bit-interleaved sync words, each including a sync pattern and a repeater_id corresponding to the repeater having information at that offset. For example, the sync word pattern interleaved at every b bit would be followed by a value corresponding to repeater$_b$ and so on. The process then begins with setting (step 905) the decimator phase for a multistage-PON repeater at a default value. The repeater then begins searching for a sync word (step 910) at the slower rate associated with reading each $n^{th}$ bit in the downstream frame. When a sync word is detected (step 915), the repeater_id value associated with the sync word is compared (step 920) with the id of the multistage-PON repeater to determine if the values match. Note that in most cases they will not, given the large number of repeaters expected to be receiving the same frame. If there is a match, however, then header sync has been achieved and the multistage-PON repeater begins reading (step 935) the header information using the default phase.

In this embodiment, if the repeater_id value associated with the detected sync word does not match that of the detecting multistage-PON repeater, then an offset difference is calculated (step 925) between the repeater_id value and the value of the detecting multistage-PON repeater. This will provide the decimation phase necessary to extract the correct header information for the detecting multistage-PON repeater. The decimator phase is then adjusted (step 930), and the process proceeds to step 935 where to begin reading bits at the correct offset, that is, receiving the data that was intended for this multistage-PON repeater. The bandwidth map parser of the multistage-PON repeater then begins parsing the relevant header information to determine the transmitted bandwidth allocation. The process may then continue according to, for example, the relevant portions of the method 800 described above and illustrated in FIG. 10.

Note that the sequence of operation illustrated in FIGS. 10 and 11 represent exemplary embodiments; some variation is possible within the spirit of the invention. For example, additional operations may be added to those shown in FIGS. 10 and 11, and in some implementations one or more of the illustrated operations may be omitted. In addition, the operations of the method may be performed in any logically-consistent order unless a definite sequence is recited in a particular embodiment.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. An apparatus, comprising:
   a multistage passive optical network (PON) repeater for receiving downstream transmissions via a first stage of the PON comprising an optical line terminal (OLT);
   a decimator configured to receive and decimate a payload portion of a downstream bit interleaving passive optical network (BI-PON) frame received from the OLT, wherein the payload portion of the BI-PON is decimated to identify data intended for at least one of a plurality of second stage end devices associated with the multistage PON repeater; and
   a transmitter configured to transmit the decimated the payload portion of the downstream BI-PON frame toward a second stage of the PON, wherein the second stage comprises the plurality of second stage end devices and a second stage optical splitter;
   wherein at least one second stage end device is at least one of a VoIP telephone and a radio head.

* * * * *